(12) United States Patent
Tommasi et al.

(10) Patent No.: US 11,741,123 B2
(45) Date of Patent: Aug. 29, 2023

(54) VISUALIZATION AND EXPLORATION OF PROBABILISTIC MODELS FOR MULTIPLE INSTANCES

(71) Applicant: INTERNATIONAL BUSINESS MACHINES CORPORATION, Armonk, NY (US)

(72) Inventors: Pierpaolo Tommasi, Dublin (IE); Stephane Deparis, Dublin (IE); Alessandra Pascale, Phoenix Parks Racecourse (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/454,202

(22) Filed: Nov. 9, 2021

(65) Prior Publication Data

US 2023/0147643 A1    May 11, 2023

(51) Int. Cl.
*G06F 16/00* (2019.01)
*G06F 16/26* (2019.01)
*G06F 16/28* (2019.01)
*G06F 16/30* (2019.01)

(52) U.S. Cl.
CPC ............ *G06F 16/26* (2019.01); *G06F 16/283* (2019.01)

(58) Field of Classification Search
None
See application file for complete search history.

(56) References Cited

U.S. PATENT DOCUMENTS

| 8,521,774 | B1* | 8/2013 | Cai ................ G06F 16/24578 |
| | | | 707/776 |
| 10,058,995 | B1* | 8/2018 | Sampedro ............... B25J 9/163 |
| 10,176,607 | B2* | 1/2019 | Cahan .................... G06F 16/26 |
| 10,846,321 | B2* | 11/2020 | Xu ........................ G06F 16/447 |
| 11,120,364 | B1* | 9/2021 | Gokalp ................. G06N 20/00 |
| 2002/0091707 | A1* | 7/2002 | Keller ................... G06F 16/30 |
| 2008/0208880 | A1* | 8/2008 | Dong .................... G06F 16/283 |
| 2009/0018863 | A1 | 1/2009 | Toon et al. |
| 2009/0070158 | A1* | 3/2009 | Virine ............... G06Q 10/0635 |
| | | | 705/7.28 |
| 2009/0259954 | A1* | 10/2009 | Chenthamarakshan ................. |
| | | | G06F 16/26 |
| | | | 715/764 |
| 2009/0327852 | A1* | 12/2009 | MacGregor ........... G06F 16/248 |
| | | | 715/214 |
| 2010/0312747 | A1* | 12/2010 | Stolte .................... G06F 16/211 |
| | | | 707/602 |
| 2011/0184250 | A1 | 7/2011 | Schmidt et al. |

(Continued)

OTHER PUBLICATIONS

Viet Minh Vu et al. "iPMDS: Interactive Probabilistic Multidimensional Scaling", Aug. 21, 2021, IEEE (Year: 2021).*

(Continued)

*Primary Examiner* — Polina G Peach
(74) *Attorney, Agent, or Firm* — Griffiths & Seaton PLLC

(57) ABSTRACT

Embodiments facilitating data exploration in a computing environment by a processor. A multidimensional dataset may be received. The multidimensional dataset may be processed according to booting operation parameters. A visualization and exploration of an interactive representation of one or more probabilistic models for each one of a set of instances using the multidimensional dataset.

15 Claims, 12 Drawing Sheets

(56) References Cited

U.S. PATENT DOCUMENTS

| | | | | |
|---|---|---|---|---|
| 2014/0344186 | A1* | 11/2014 | Nadler | G06Q 10/067 705/36 R |
| 2015/0278334 | A1* | 10/2015 | Gerweck | G06F 16/283 707/706 |
| 2016/0180050 | A1 | 6/2016 | Holmes et al. | |
| 2016/0292248 | A1* | 10/2016 | Garcia | G06Q 10/063 |
| 2016/0350393 | A1* | 12/2016 | Zheng | G06F 16/283 |
| 2018/0232428 | A1* | 8/2018 | Fleming | G06F 16/26 |
| 2019/0050468 | A1* | 2/2019 | Williamson | G06F 16/26 |
| 2019/0155816 | A1* | 5/2019 | Dwivedi | G06F 16/254 |
| 2019/0228126 | A1* | 7/2019 | Oh | G06F 30/327 |
| 2019/0332892 | A1* | 10/2019 | Wickesberg | G06N 20/20 |
| 2020/0176113 | A1* | 6/2020 | Megerian | G16H 50/70 |
| 2020/0311100 | A1* | 10/2020 | Rupela | G06F 16/26 |
| 2020/0410373 | A1* | 12/2020 | Bin Awang Pon | G06F 16/283 |
| 2021/0042427 | A1* | 2/2021 | Wu | G06F 21/606 |
| 2021/0118577 | A1* | 4/2021 | Bettencourt-Silva | G06N 5/022 |
| 2022/0108255 | A1* | 4/2022 | Powers | G06Q 10/06393 |
| 2022/0114302 | A1* | 4/2022 | Skripkin | G06F 30/20 |
| 2022/0188693 | A1* | 6/2022 | Tommasi | G06N 5/022 |
| 2022/0253694 | A1* | 8/2022 | Alabdulmohsin | G06N 3/045 |
| 2022/0277192 | A1* | 9/2022 | Gou | G06N 3/10 |

OTHER PUBLICATIONS

Vu, Viet Minh, Adrien Bibai, and Benoit Frenay. "iPMDS: Interactive probabilistic multidimensional scaling." Jul. 2021 International Joint Conference on Neural Networks (IJCNN). IEEE, 2021. (Year: 2021).*

Wang, Yue, et al. "Probabilistic principal component subspaces: a hierarchical finite mixture model for data visualization." IEEE Transactions on Neural Networks 11.3 (2000): 625-636. (Year: 2000).*

Tommasi et al., "KITE: An Analytics Platform for Multimorbidity Management", Studies in Health Technology and Informatics, Ebook, vol. 255: Decision Support Systems and Education, pp. 30-34, 2018. (pp. 5).

Tommasi et al., "HWProfile UI: Facilitating the Exploration of a Patient Centered Risk Model", 2019 IEEE International Conference on Healthcare Informatics (ICHI), Xi'an, China, 2019, pp. 1-2.

J. Lee et al., "Risk assessment for hypertension and hypertension complications incidences using a Bayesian network," IIE Transactions on Healthcare Systems Engineering, 6:4, 246-259, Jun. 2016. (pp. 15).

Lappenschaara et al., "Multilevel temporal Bayesian networks can model longitudinal change in multimorbidity," Journal of Clinical Epidemiology 66, 1405e1416, 2013. (pp. 13).

S. Deparis et al., "An Analytical Method for Multimorbidity Management Using Bayesian Networks." Stud Health Technol Inform., vol. 247, pp. 820-824, 2018. (pp. 5).

S. Deparis et al., "Building a Risk Model for the Patient-centred Care of Multiple Chronic Diseases," 2019 IEEE International Conference on Bioinformatics and Biomedicine (BIBM), San Diego, 2019, pp. 1078-1082. (pp. 5).

* cited by examiner

VISUALIZATION AND EXPLORATION OF PROBABILISTIC MODELS FOR MULTIPLE INSTANCES

BACKGROUND OF THE INVENTION

Field of the Invention

The present invention relates in general to computing systems, and more particularly, to various embodiments for providing visualization and exploration of probabilistic models in a computing environment using a computing processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. Computing systems can include an Internet of Things (IoT), which is the interconnection of computing devices scattered across the globe using the existing Internet infrastructure. IoT devices may be embedded in a variety of physical devices or products for assisting in improvements to the quality of life and appropriate living accommodations.

SUMMARY OF THE INVENTION

Various embodiments for facilitating data exploration of probabilistic models in a computing environment by a processor, are provided. In one embodiment, by way of example only, a method for providing visualization and exploration of probabilistic models for multiple instances in a computing environment, again by a processor, is provided. The multidimensional dataset may be processed according to booting operation parameters. A visualization and exploration of an interactive representation of one or more probabilistic models for each one of a set of instances using the multidimensional dataset.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
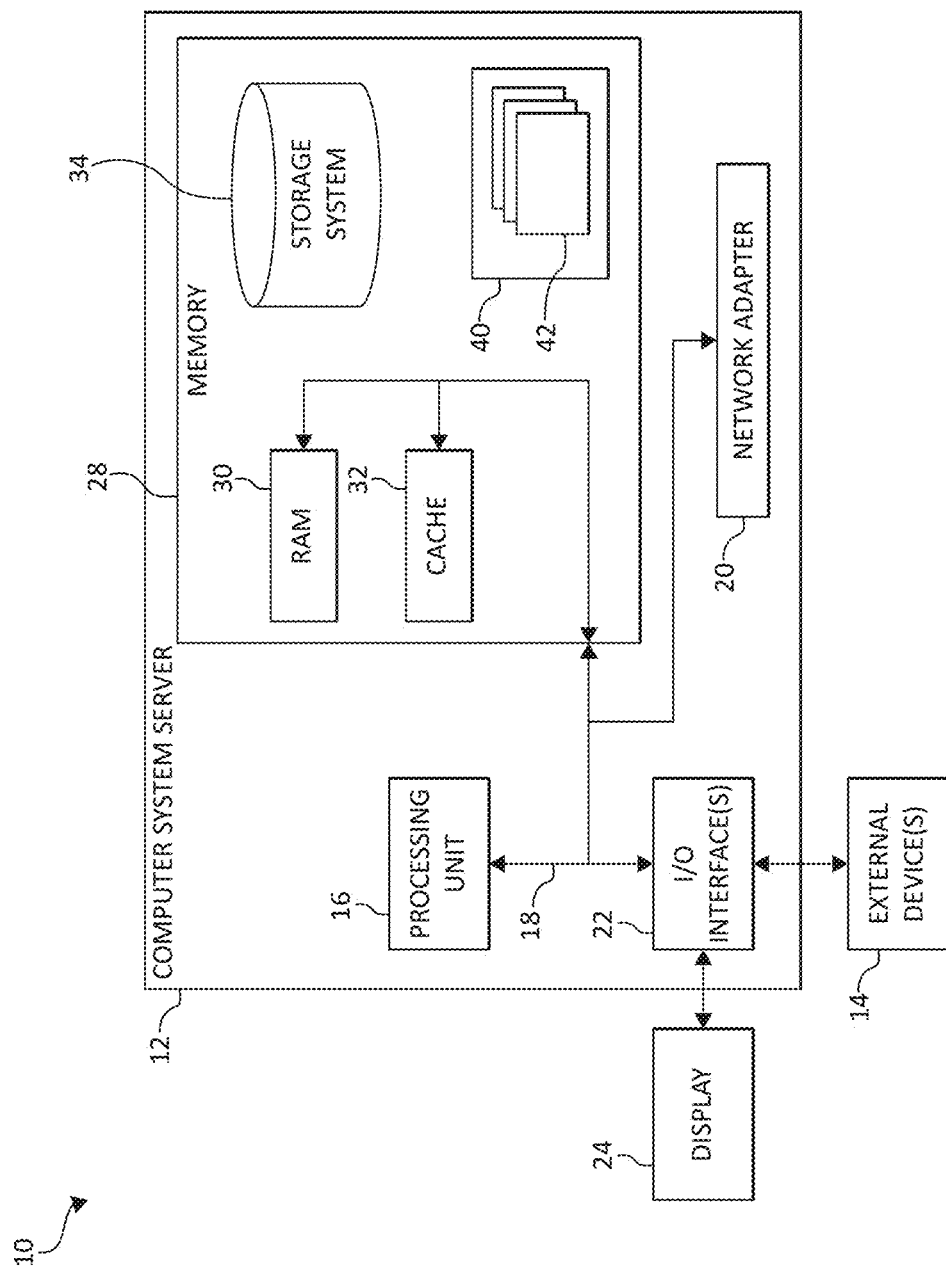
FIG. 1 is a block diagram depicting an exemplary cloud computing node according to an embodiment of the present invention.

In today's environment, computing system may store and retrieve large amounts of data, which may be in a local, remote, and/or virtualized database. These databases may use a variety of resources, techniques, and applications for processing, storing, analyzing, and visualizing data. For example, these databases store large amounts of data (e.g., petabytes of data). Often times, such computing systems may use a "Big Data" framework to process large amounts of data. That is, "Big Data" is a collection of tools, techniques, and operations used for data sets that becomes so voluminous and complex that traditional data processing applications are inadequate to store, query, analyze or process the data sets using current database management and data warehousing tools or traditional data processing applications.

Data is often multidimensional such as, for example, a multidimensional dataset relating to healthcare about a patient that may include multiple dimensions such as, for example, age, gender, presence of a disease, any vital statistics. Currently, attempts to provide visualizations of the data to explore results from probabilistic models are usually very convolute and static. For example, a common scenario is a script which needs to be manually modified for a portion of results a domain expert/user is focusing upon for analysis.

Furthermore, when an insight (e.g., gaining an accurate and deep intuitive understanding or a defined level or degree of analysis and understanding) on data and on a probabilistic model is required, current computing system are unable provide a unified interactive exploration of a visual presentation of the data. However, a key challenge in building explanatory and/or predictive models is when the decisions are sequentially made in a non-deterministic manner by multiple decision makers (e.g., each decision is made by one decision maker only, but the outcome of a decision of one decision maker is the basis for the decision of another, and the actual decision makers are unknown to the observer). Therefore, a need exists for extracting a model of one or all decision makers from the outcomes thereby providing both visualizations and the ability to explore and interact with the visualized data.

Accordingly, the present invention provides for visualization and exploration of probabilistic models for multiples instances in a computing environment. In one aspect, a multidimensional dataset may be received and processed according to booting operation parameters. A visualization and exploration of an interactive representation of one or more probabilistic models for each one of a set of instances using the multidimensional dataset. It should be noted that a probabilistic model is a model that estimates, based on historical data, a probability of an event occurring. Probabilistic models incorporate random variables and probability distributions into the model of an event or phenomenon.

Thus, various embodiments described herein provide for a global view with all the dimensions for visualization and exploration of an interactive representation of one or more probabilistic models for multiples instances using a multidimensional dataset in a computing environment. A user is enabled to select or deselect (e.g., via a graphical user interface "UI") one or more values and/or constraints per dimension (i.e., observed variables in a graph) in the interactive representation of the one or more probabilistic models using multidimensional dataset. A probabilistic function (e.g., inferring function built on Bayesian network) may be used to illustrate, display, show, or highlight the inferred probabilities on all the other dimensions. Thus, the present invention provides to facilitate data exploration of probabilistic model results through an interactive visualization.

In some implementations, provide for a global view with a selection of the most relevant dimensions per case for visualization and exploration of an interactive representation of one or more probabilistic models for multiples instances using a multidimensional dataset in a computing environment. The dimensions may be ranked on a per case basis. For each instance (e.g., case), the ranking determines which dimensions are displayed among the available dimensions. The user can add, amend, or delete the dimensions, allowing exploration beyond suggested dimensions. The use can specify a value for a given dimension in a given instance/case. For each instance/case, a probabilistic function (e.g., an inferring function built on a Bayesian Networks) can be used to show the inferred probabilities of the most relevant and/or chosen dimensions. In some implementations, external systems can provide additional recommendations on any of the instances/cases or a shared insight belonging to all instances/cases.

In some implementations, the present invention provides to facilitate data exploration of probabilistic models results through an interactive visualization, which displays the most relevant information about several cases in one single self-contained view. Such view uses artificial intelligence to assist a user in gaining access to all the most relevant information displayed at all times thereby removing the need to switch to other views or between different cases.

In some implementation, the present invention may use, as input, 1) multidimensional datasets that are used to train one or more probabilistic models, and 2) a set of cases (to query probabilistic models), each used as evidence. For each case, each of the dimensions may be ranked according to a degree of relevance associated with the set of instances. That is, the dimensions may be ranked according to a relevancy measure (e.g., highest probability first, output of a reasoning engine, topological information, or other defined parameters).

For each case, the dimensions may be filtered (e.g. display top n-number of dimensions only). The probabilistic information computed for each dimension may be filtered thereby showing/displaying the probabilistic information computed from each dimension and providing the ability to tune the selection by manually discarding or selecting dimensions. Any tuning action or adjustments may be collected as feedback to improve the ranking operations.

In some implementations, an interactive representation of the probabilistic models applied to the multidimensional datasets may be depicted/displayed. The interactive representation may include all the evidence collected for every instance (e.g., for each patient in a group of patients). The interactive representation may include the probabilistic information of the most relevant dimensions, as per the ranking for each instance. In one aspect, optionally, for each case, interactive representation may include further recommendations or insights coming or received from other systems (e.g., received from $3^{rd}$ party systems). In one aspect, optionally, the interactive representation may depict a recommendation or insights about a shared goal among all the set of instances (e.g., all cases).

In some implementations, the present invention provides for booting and training the probabilistic models. In one aspect, the following set of booting operations may be performed. In one step, multidimensional datasets may be read as input. In an additional step, one or more probabilistic models may be trained of the input multidimensional datasets (e.g., Bayesian network, Markov chain, etc.) either offline or online. In an additional step, optionally, one or more simplified or "reduced" probabilistic models may be generated/built on input multidimensional datasets, if no machine learning is necessary (e.g. independent value distributions) either offline or online. In an additional step, an interactive representation of the multidimensional datasets may be initialized based on the one or more probabilistic models and set of instances (e.g., use cases for a group of persons).

In some implementations, the present invention enables the most relevant dimensions for each set of instances to be visualized along with one or more possible values and probability of occurrence for all the different considered instances. A ranking operation may executed to rank the dimensions on a per case basis and determine and filter the most relevant ones.

In some implementations, the present invention provides for fetching or search for additional contextual data to support the dimensions (e.g., recommendations, stats, read-only data) from external system on a per-case basis (single instance of a set of instances). In some implementations, the present invention provides for provided shared insights obtained by combining/aggregating the results of the different instances and different contexts (e.g., different contextual data).

In some implementations, the present invention provides for interaction with visualization representation. In some implementations, the present invention provides for allowing the user to repetitively specify a constraint on the values of one or more dimensions on one or more instances (e.g., by selecting or deselecting at least one value or range of values for one or more dimensions, or by adding/removing dimensions. In some implementations, the present invention provides for inferring a new probability distribution for the values of each of the dimensions of interest using the probabilistic models and user constraints and updating the interactive representation.

In some implementations, the present invention provides for collecting feedback and using it to improve the ranking operations.

In some implementations, the present invention provides for retrieving of external recommendations and additional insights/contextual data. In some implementations, the present invention provides for fetching and visualizing external data generated using as input the user selection on a per case basis. In some implementations, the present invention provides for updating the data at each user selection update. In some implementations, the present invention provides for visualizing a shared goal between the set of instances (e.g., a shared goal amongst a group of persons such as, for example, a family or co-workers). In some implementations, the present invention provides for aggregating the results of all showcased instance to provide aggregated/shared insights. In some implementations, the present invention provides for updating the insights at each user selection update.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16 (which may be referred to herein individually and/or collectively as "processor"), a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
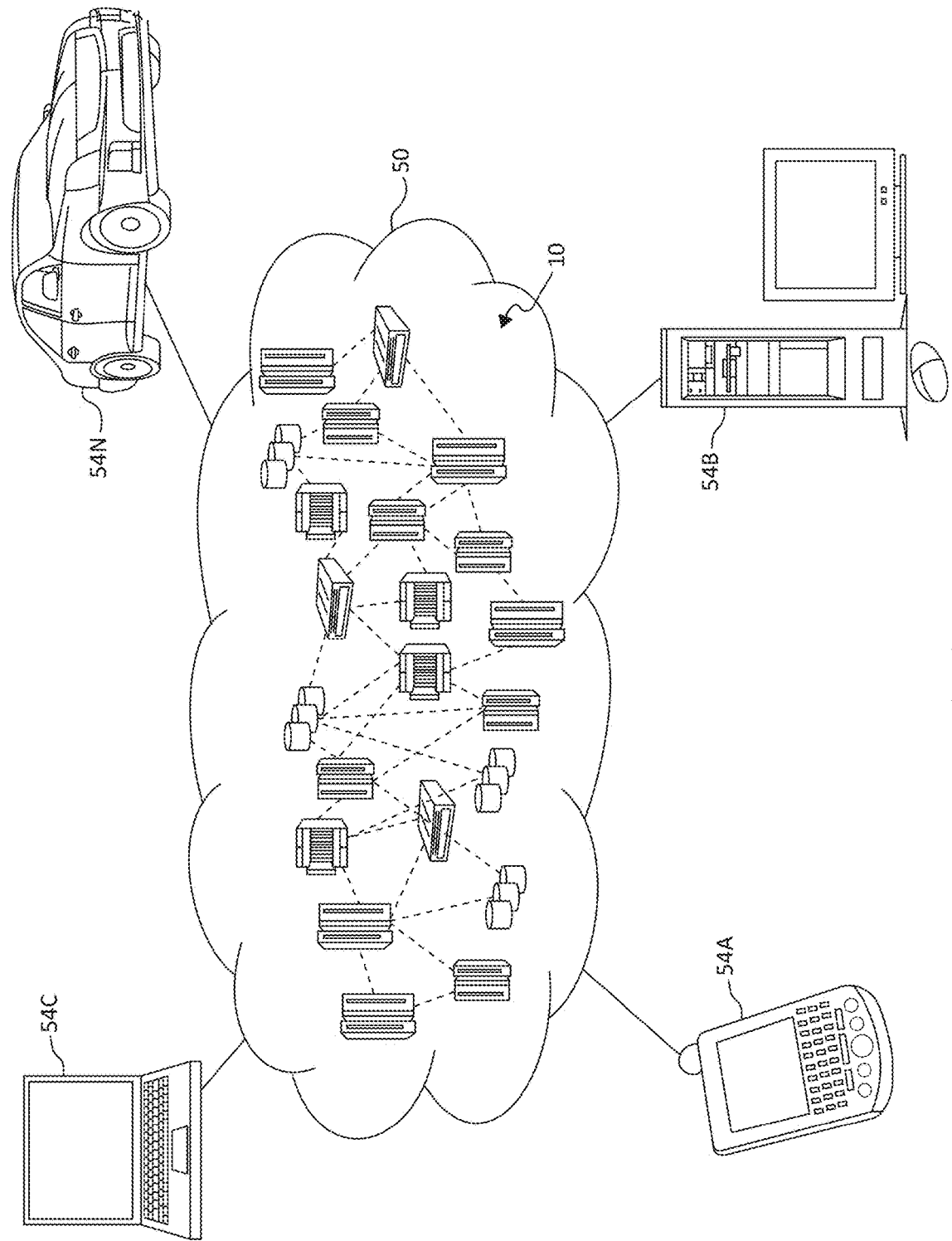
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
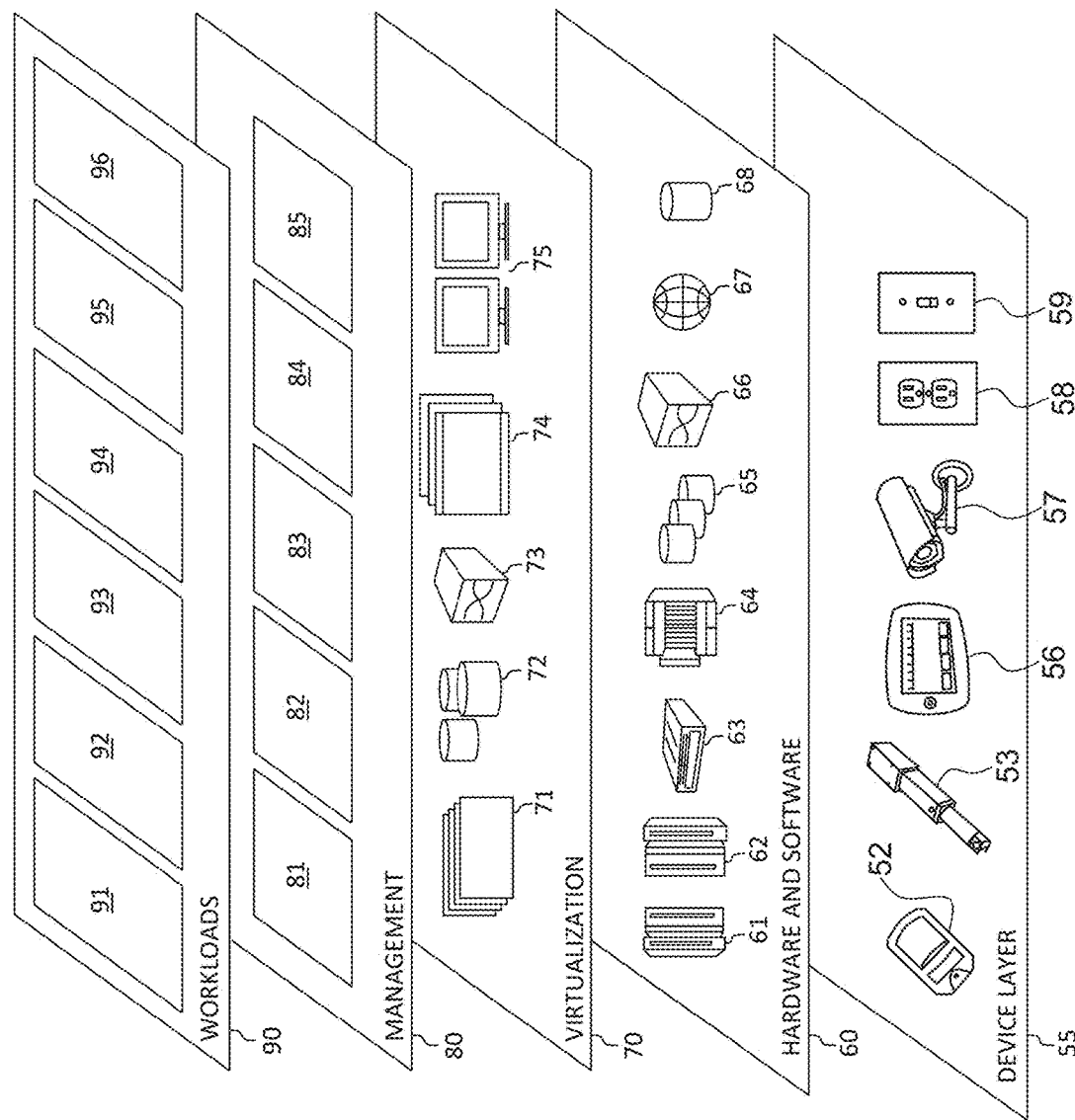
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for facilitating data exploration of probabilistic models for multiple instances. In addition, workloads and functions 96 for facilitating data exploration of probabilistic models for multiple instances may include such operations as data analysis, machine learning (e.g., artificial intelligence, natural language processing, etc.), user analysis, IoT sensor device detections, operation and/or analysis, as will be further described. One of ordinary skill in the art will appreciate that the workloads and functions 96 for facilitating data exploration of probabilistic models for multiple instances may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the present invention provides for visualization and exploration of probabilistic models for multiple instances in a computing environment. A multidimensional dataset may be received. The multidimensional dataset may be processed according to booting operation parameters. A visualization and exploration of an interactive representation of one or more probabilistic models for each one of a set of instances using the multidimensional dataset.

Figure 4:
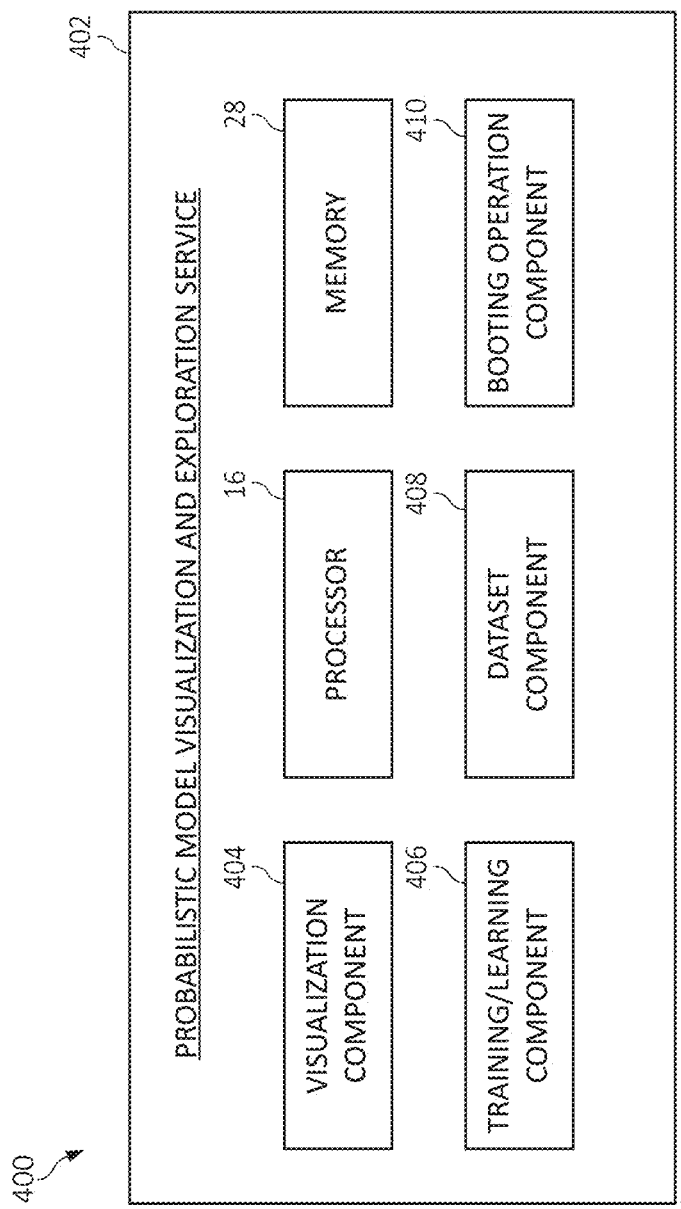
FIG. 4 is an additional block diagram depicting an exemplary functional relationship between various aspects of the present invention.

Turning to FIG. 4, a block diagram of various hardware 400 equipped with various functionality as will be further described is shown in which aspects of the mechanisms of the illustrated embodiments may be realized. In one aspect, one or more of the components, modules, services, applications, and/or functions described in FIGS. 1-3 may be used in FIG. 4.

For example, computer system/server 12 of FIG. 1 may be included in FIG. 4 and may be connected to other computing nodes over a distributed computing network, where additional data collection, processing, analytics, and other functionality may be realized. The components of computer system/server 12 may include, but are not limited to, one or more processors or processing units 16 ("processor") and/or a system memory 28.

The computer system/server 12 of FIG. 1, may include probabilistic model visualization and exploration service 402, along with other related components in order to providing visualization and exploration of probabilistic models. The probabilistic model visualization and exploration service 402 may provide visualization and exploration of probabilistic models.

The probabilistic model visualization and exploration service 402 may include a visualization component 404, a training/learning component 406, a dataset component 408, and a booting operation component 410.

The dataset component 408, may include and/or receive from an external source (e.g., external to the probabilistic model visualization and exploration service 402) one or more multidimensional datasets. In one aspect, for example, multidimensional dataset may be visualized as a matrix having a plurality of dimensions. For example, if a multidimensional dataset has two dimensions, the multidimensional dataset may be visualized as a flat grid. If a multidimensional dataset has three dimensions, the multidimensional dataset may be visualized as a cube. Each cell in the multidimensional dataset may contain a quantitative measure value. For example, each cell in the multidimensional dataset may contain a measure value indicating an amount of money. Each cell in the multidimensional dataset may be identified by providing an index value from each one of the dimensions of the multidimensional dataset. That is, a measure value may be identified by stating that the measure value lies at dimension index value "i" in the first dimension and dimension index value "j" in the second dimension. This measure value may also be denoted Aij, where A is an identifier of the dataset. For example, if dataset A has two dimensions, a cell in the multidimensional dataset may be identified by stating that the cell is located in the sixth row and the fifth column of the multidimensional dataset may (e.g., A6,5).

The multidimensional dataset may also contain enterprise data. For example, assume an enterprise healthcare dataset has eight patients, provides ten different "products" (e.g., medicine), and provides the products over six days at varying dosages. In this case, a first dimension of the multidimensional dataset may describe patient of the enterprise, a second dimension of the dataset may describe the products (e.g., the medicine), and a third dimension of the dataset may describe dosage rates and amounts. Data in individual cells of the multidimensional dataset may reflect a dosage amount consumed by a patient for a product (e.g., medicine) at a certain dosage rate and amount. In some aspects, the data can be automatically aggregated in some form (e.g., if data has too many values, the system might choose to aggregate them in ranges). For example, if a dimension is "products sold count," and the values range from 0 to 1 million, rather than showing all the possible values, all the possible values may be aggregated in categories/ranges such as, for example, "0", "1-100", "100-10,000", "10,000-1,000,000".

The visualization component 404 may receive and use multidimensional dataset. The visualization component 404 may read the multidimensional dataset according to a set of booting operation parameters. The visualization component 404 may provide visualization and exploration of an interactive representation of one or more probabilistic models for multiple instances using the multidimensional dataset.

The visualization component 404 may rank each of a plurality of dimensions according to a degree of relevance associated with the set of instances where the ranking indicates those of the plurality of dimensions that are included in the interactive representation for visualization and exploration.

The booting operation component 410 may define one or more booting operation parameters. That is, the booting operation component 410 may assist the visualization component 404 for providing visualization and exploration of an interactive representation of one or more probabilistic models using the multidimensional dataset.

In one aspect, by way of example only, the booting operation component 410 may define one or more booting operation to include 1) reading as input the multidimensional dataset, 2) training, learning, and/or computing a probabilistic model "M" of from the multidimensional dataset (e.g., Bayesian network, Markov chain, etc.) either offline or online, 3) optionally, building a simplified probabilistic models M on the multidimensional dataset if no learning is necessary (e.g., independent value distributions) either offline or online, and/or 4) initializing an interactive representation of the multidimensional dataset based on the probabilistic models M.

Thus, in association with the booting operation component 410, the training/learning component 406 may training, learning, and/or computing a probabilistic model "M" of from the multidimensional dataset (e.g., Bayesian network, Markov chain, etc.) wherein the training, learning, and/or computing may occur online, offline, or a combination thereof.

The visualization component 404 may infer one or more values per dimension from the multidimensional dataset for visualization and exploration based on the one or more values per dimension of the multidimensional dataset selected or deselected by a user. In another aspect, the visualization component 404 may infer one or more values per dimension from the multidimensional dataset for visualization and exploration based on a single value of the multidimensional dataset selected by a user. Additionally, the visualization component 404 may infer a probability of values for one or more of a plurality of dimensions for each one of a set of instances for the visualization and the exploration based a machine learning model and one or more constraints.

The visualization component 404 may provide probabilistic information for each of a plurality of dimensions associated with the set of instances. The visualization component 404 may select or eliminate one or more of the plurality of dimensions based on the probabilistic information. That is, the visualization component 404 may select, modify, or deselect one or more values for one or more of a plurality of dimensions for each one of the set of instances The visualization component 404, in association with the training/learning component 406, collect, receive, and/or provide feedback data to a machine learning model or an aggregating function for ranking each of the plurality of dimensions associated with the set of instances based on selecting or eliminating the one or more of the plurality of dimensions.

The visualization component 404 may identify and/or provide a relationship between one or more values per dimension for the visualization and exploration based on a single value of the multidimensional dataset selected by a user.

The visualization component 404 may generate one or more recommendations relating to target objectives of one or more of a plurality of dimensions associated with the set of instances.

It should be noted, that in one embodiment, by way of example only, the training/learning component 406 may perform a machine learning operation that may include, for example, an instance of IBM® Watson® such as Watson® Analytics (IBM® and Watson® are trademarks of International Business Machines Corporation). By way of example only, the training/learning component 406 may determine one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting.

Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5:
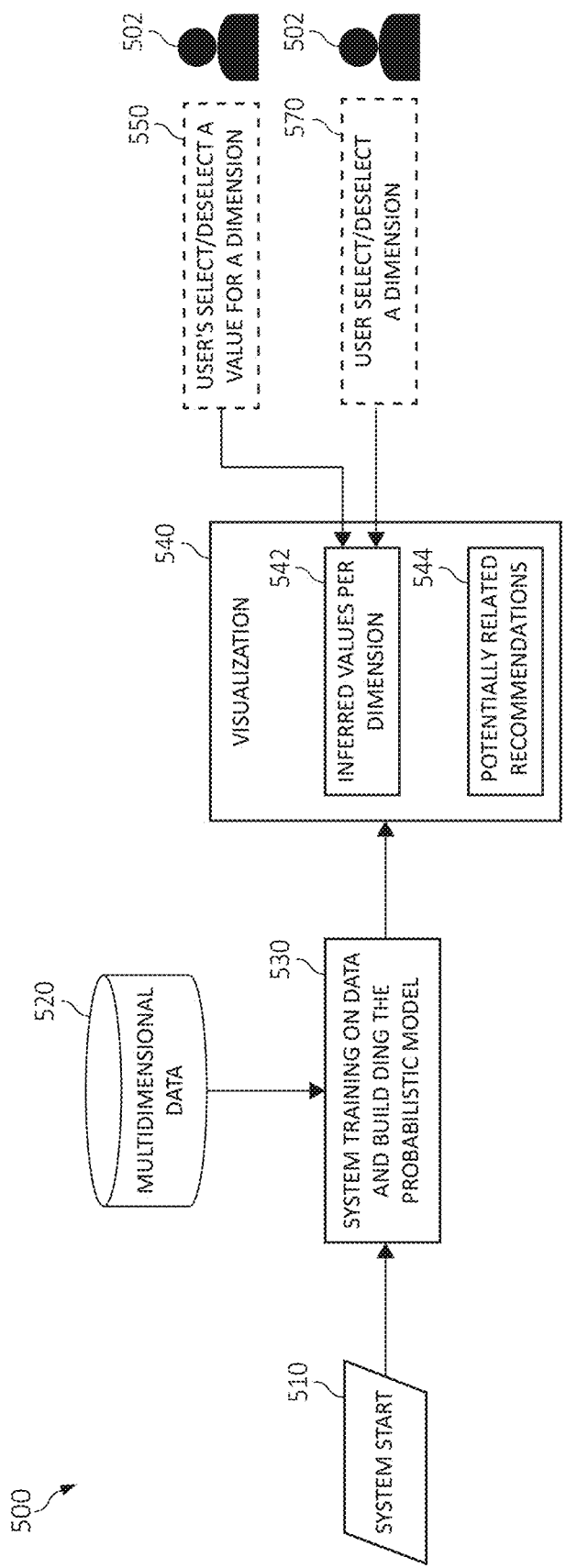
FIG. 5 is block-flow diagram depicting an exemplary operation for providing visualization and exploration of probabilistic models in which aspects of the present invention may be realized.

Turning now to FIG. 5, block-flow diagram of exemplary functionality 500 FIG. 5 depicts an exemplary operation for providing simultaneous visualization and exploration of probabilistic models for multiple instances according to various aspects of the present invention. As shown, the various blocks of functionality are depicted with arrows designating the blocks' 500 and 550 relationships with each other and to show process flow. Additionally, descriptive information is also seen relating each of the functional block

500. As will be seen, many of the functional blocks may also be considered "modules" of functionality, in the same descriptive sense as has been previously described in FIG. 5. With the foregoing in mind, the module block 500 may also be incorporated into various hardware and software components of a system for image enhancement in accordance with the present invention. Many of the functional block 500 may execute as background processes on various components, either in distributed computing components, or on the user device, or elsewhere, and generally unaware to the user performing generalized tasks.

A computing system (which may include the probabilistic model visualization and exploration service 402 of FIG. 4) may start, as in block 510, and receive (as input) multidimensional data 520. The multidimensional data 520 may be used for training and building one or more probabilistic models, as in block 530. Additionally, as in block 530, one or more booting operation parameters (e.g., set of booting operations) may perform: 1) reading as input a multidimensional dataset 520, 2) optionally training, learning, or determining the probabilistic model of the multidimensional data 520 (e.g., Bayesian network, Markov chain, etc.) either offline or online, 3) optionally building the one or more aggregation/aggregating functions (e.g., count/average of elements in a group given a constraint) on the multidimensional data 520 if there is no learning is necessary (e.g., independent value distributions) either offline or online, and/or 4) initializing an interactive representation of the multidimensional data 520 based on the probabilistic model.

It should be noted that in regard to step 3), above, in there is no learning involved and there will not be a probabilistic model left behind. As such, an aggregating function may be built. For example, assume a user selects/clicks as a gender "male", the UI will update the diabetes scattering with the percentages of males with and without diabetes (e.g., performing a query on the database and there is no need for a prediction model). In some implementations, there may be no learning involved, but some form of aggregation could be used instead (e.g., a machine learning model may be unnecessary).

Thus, as in block 540, an interactive representation of the probabilistic model of the multidimensional data 520 for multiple instances may be generated (as output). That is, the computing system provides a visualization and exploration of the interactive representation of one or more probabilistic models for multiple instances using multidimensional dataset 520. The interactive representation of one or more probabilistic models for multiple instances using multidimensional dataset 520 provides visualization and exploration of all the available dimensions, all possible values and probability of occurrence of one or more probabilistic models for multiple instances using multidimensional dataset 520.

Also, as in blocks 550 and 570, a user 502 is enabled to repetitively specify a constraint on one or more values of one or more dimensions of the multidimensional data 520 for multiple instances (e.g., by selecting or deselecting at least one value or range of values for a particular dimension of a particular instance for multiple instances of the multidimensional data 520). For example, the user 502 may select/deselect a value of a dimension of the multidimensional data 520, as in block 550. The user 502 may select (e.g., specify or void) a value for a given dimension in particular instance of the multidimensional data 520 (where multiple dimensions and values are representative of), as in block 560. That is, an "entry" may be defined as a group of constraints. For example, if there is knowledge about something (e.g., a topic, subject, person, etc.) such as, for example, a patient (e.g. male, with diabetes, without congestive heart failure "CHF", high pressure, etc.), that patient may be selected (thus the term "entry"). However, in one implementation there may be a list of patients and one or more entries may be selected thereby proactively selecting one or more constraints. Additionally, the user 502 may select/deselect a dimension of the multidimensional data 520, as in block 550.

As part of block 540 (and based on one or more of the user 502 selections from blocks 550 and/or 570), a new probability distribution for the values of each of the dimensions of interest using the probabilistic model and user constraints may be inferred and the interactive representation of one or more probabilistic models, as in block 542. Additionally, as in block 544, one or more potentially related recommendations may be identified, retrieved, and/or visualized (based the user 502 selections from blocks 570). For example, additional recommendations on any of the cases or a shared insight belonging to all cases may be retrieved, selected, and/or displayed.

To further illustrate the operation of FIGS. 4-5, consider the following example. Assume a team of domain experts needs to evaluate a vulnerable population and/or group of people (e.g., "patients" or "family" in a health care industry) using a statistical modeling based on Bayesian Theory. Thus, the present invention provides for switching, for example, across different patients/groups (e.g., a family) to learn and gain additional insights of a trend for one or more dimensions of interest. The present invention may depict the most relevant dimensions and values (e.g., gender: M or F, age: 21, Hypertension: "Yes" or "No") and allowing to drill down with one or more desired constraint (e.g., gender: M, age: 21, Hypertension: "No") for population and/or group of people (e.g., "patients" or "family" in a health care industry). Thus, the present invention provides, for example, in the health care industry, enables visualization and focus on population and/or group of people (e.g., "patients" or "family" in a health care industry), visualization and focus on the individual and show all the available data, focus on the data while depicting an aggregate value per dimension (e.g., average age, gender distribution, etc.), and/or focus on a graph and current procedural terminology ("CPT") shown on graphs, which may be confusing and lacking interaction with the user.

To further illustrate, consider the following functional graphs of FIG. 6A-6E for providing visualization and exploration of probabilistic models. Thus, as depicted in graphs 600 of graphs of FIG. 6A-6E, as user in enable to have an immediate view or "initial state") that is "visual" and "explorable" of the multidimensional data based on the probabilistic models for each one of a set of instances. By using an interactive function to produce one or more inferred probabilities, the graphs of the interactive representation of one or more probabilistic models for each one of a set of instances using multidimensional dataset provide the user real-time selection of one or more dimensions of the multidimensional dataset and the user can immediately have an overview of an interesting portion of the data (e.g., subpopulation in case of healthcare).

Figure 6A:
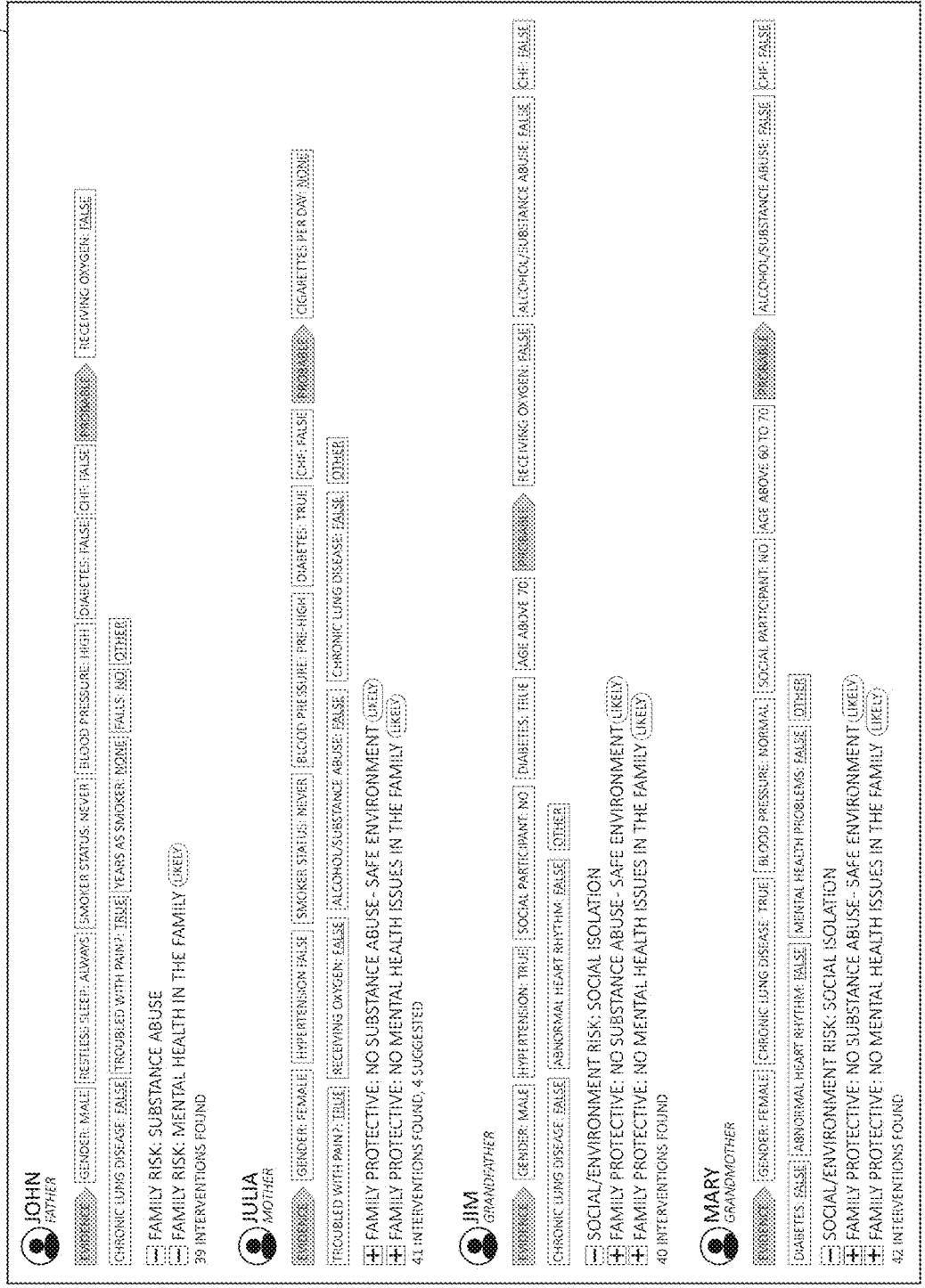
FIGS. 6A-6E are graph depicting an exemplary operation for providing visualization and exploration of probabilistic models for multiples instances in which aspects of the present invention may be realized.

For example, graph 600 of FIG. 6A depicts an initial state diagram of an interactive representation 610 following the operation described in FIGS. 4-5 where a booting operation follows a set of boot/training operations to provide visualization and exploration of an interactive representation of one or more probabilistic models for each one of a set of instances using multidimensional dataset. It should be noted that the initial state diagram of an interactive representation 610 may also be referred to as a second state or "after the boot phase" meaning that the system booted but there has been no user interaction at this point. As depicted, interactive representation 610 depicts a group of persons or "set of instance," such as, for example, John, Julia, Jim, and Mary all of whom may have some form of relationship (e.g., family members).

Figure 6B:
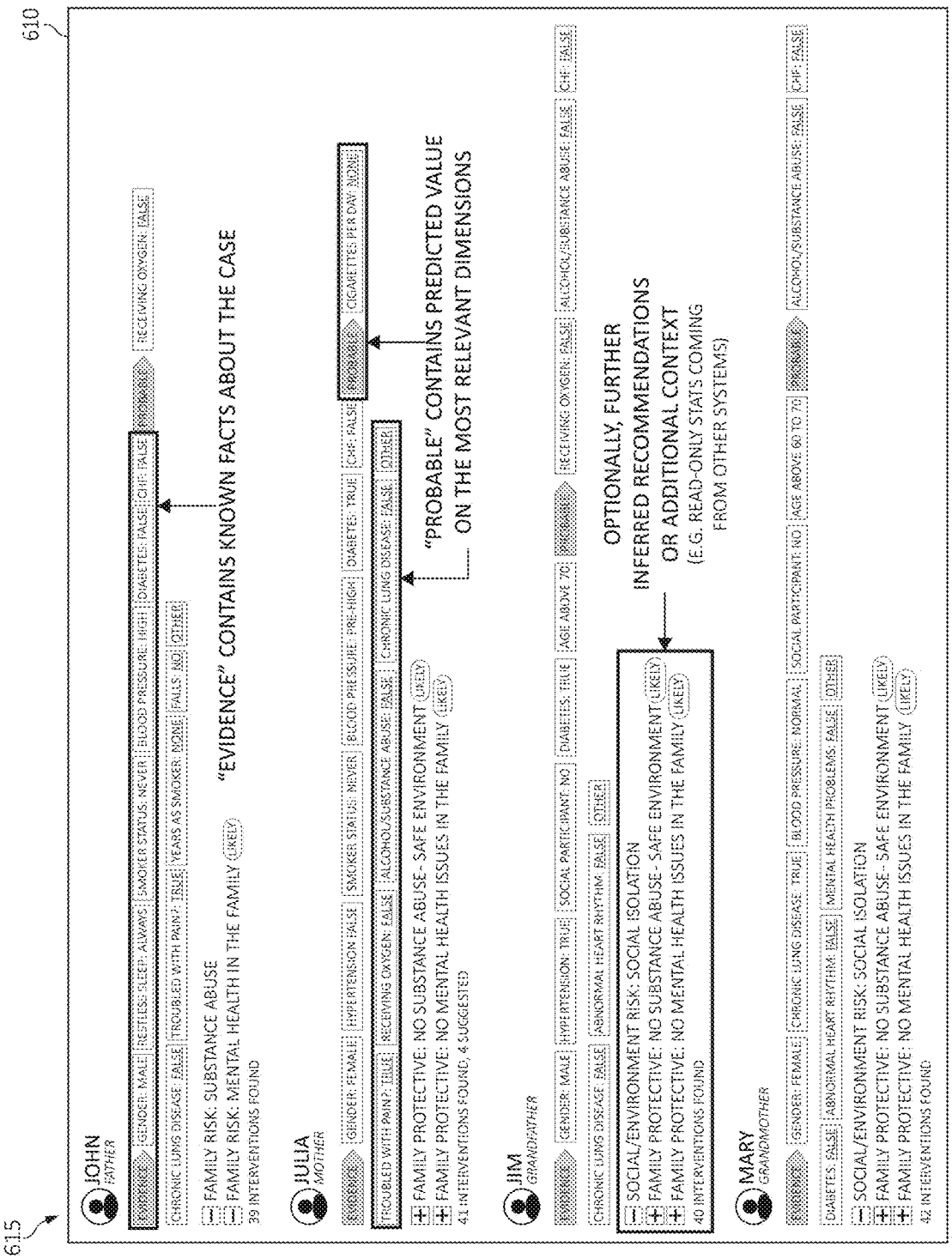

In graph 615 of FIG. 6B, a user may select one or more values of the interactive representation 610. For example, a user may select one or more dimensions, which are evidence of known facts about a case/patient such as, for example "Gender: "Male", "Restless Sleep: "Always", Smoker Status: "Never", Blood Pressure: "High", Diabetes "False," and CHF: "false", etc. for the patient John). One or more inferred probabilities, which contain predicted values, of each of the most relevant dimensions may also depicted particularly for all other instances (e.g., all other family members). For example, a predicted value of "None" may be present for Julia as the dimension for "smoker status: "never"). In some implementations, the interactive representation 610 indicates, optionally, other inferred recommendations or additional contextual data (e.g., read-only statistics coming from one or more external sources) such as, for example Jim's family "protective" status may provide inferred recommendations or additional contextual data of "likely" to have a safe environment based on the external data.

Figure 6C:
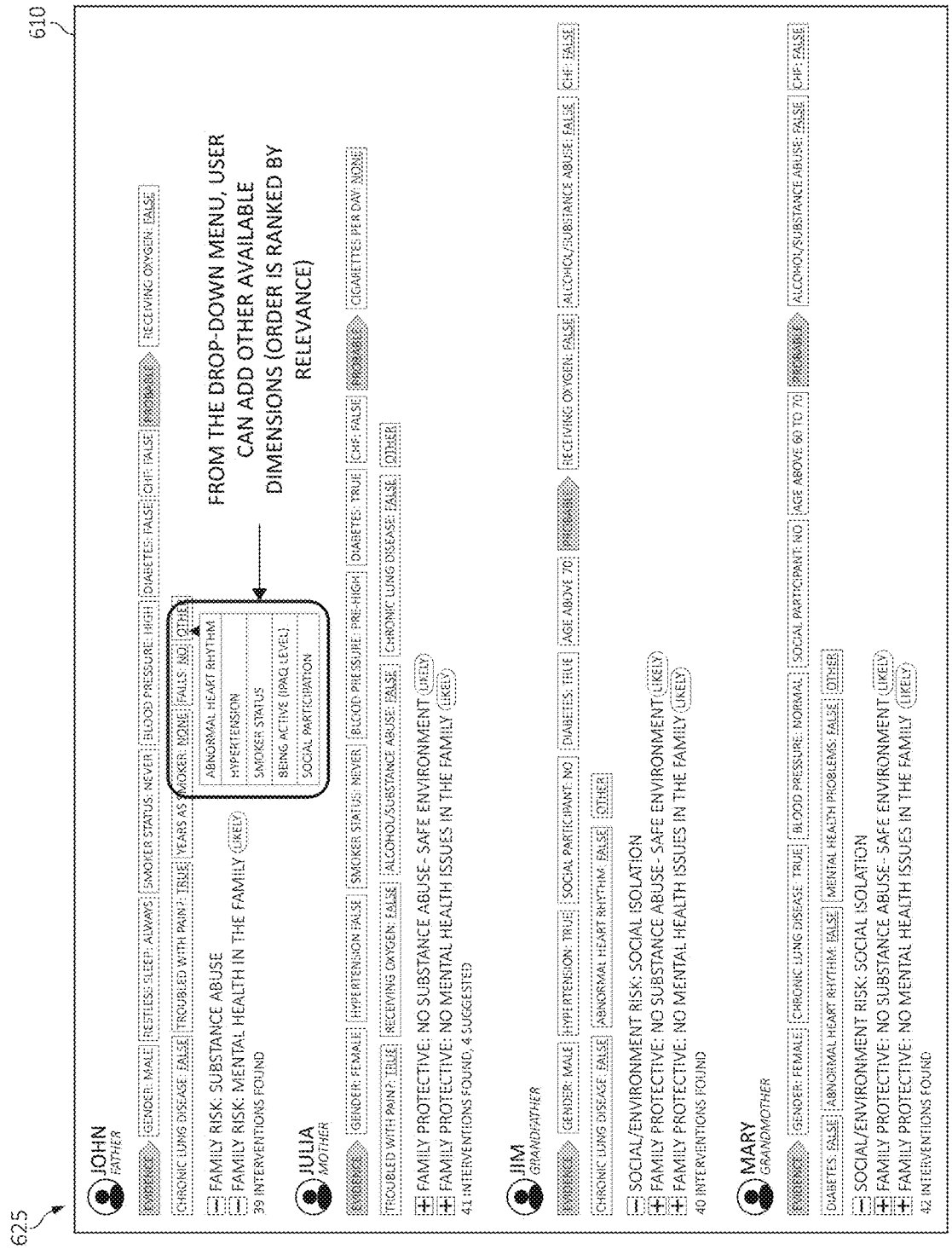

In graph 625 of FIG. 6C, the user may "hover" (e.g., a graphical control element "drop down menu) may be activated when the user moves or "hovers" a pointer over a trigger area, which may be caused by a mouse, digital pen, finger on a touch pad, or other stimuli, etc.) over a selected region of the interactive representation 610 such as, for example, the user hovering over one or more dimensions such as, for example, "others" and a menu of different information may appear (e.g., hypertension, being active, social participation, etc.). That is, is enable to select another available dimension (allowing the user to go beyond the most relevant dimension suggested by the probabilistic models for each one of a set of instances using multidimensional dataset).

Figure 6D:
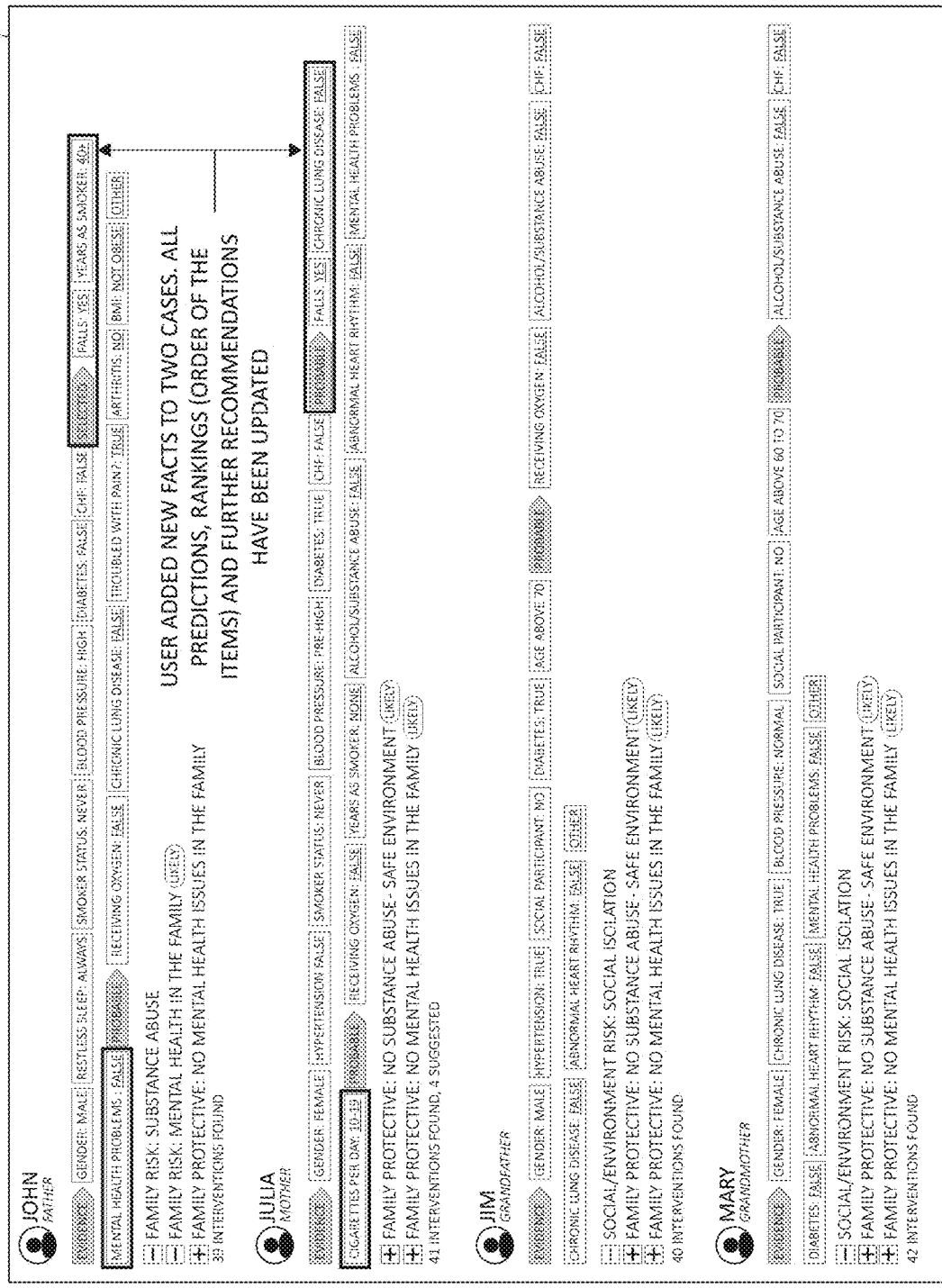

In graph 635 of FIG. 6D, a user may add a constraint (e.g., a selected value) such as, for example, additional or new facts or dimensions to one or more instances (e.g., two cases/patients). All predictions, rankings (e.g., an order of the items presented), and further recommendations may be updated and presented.

Figure 6E:
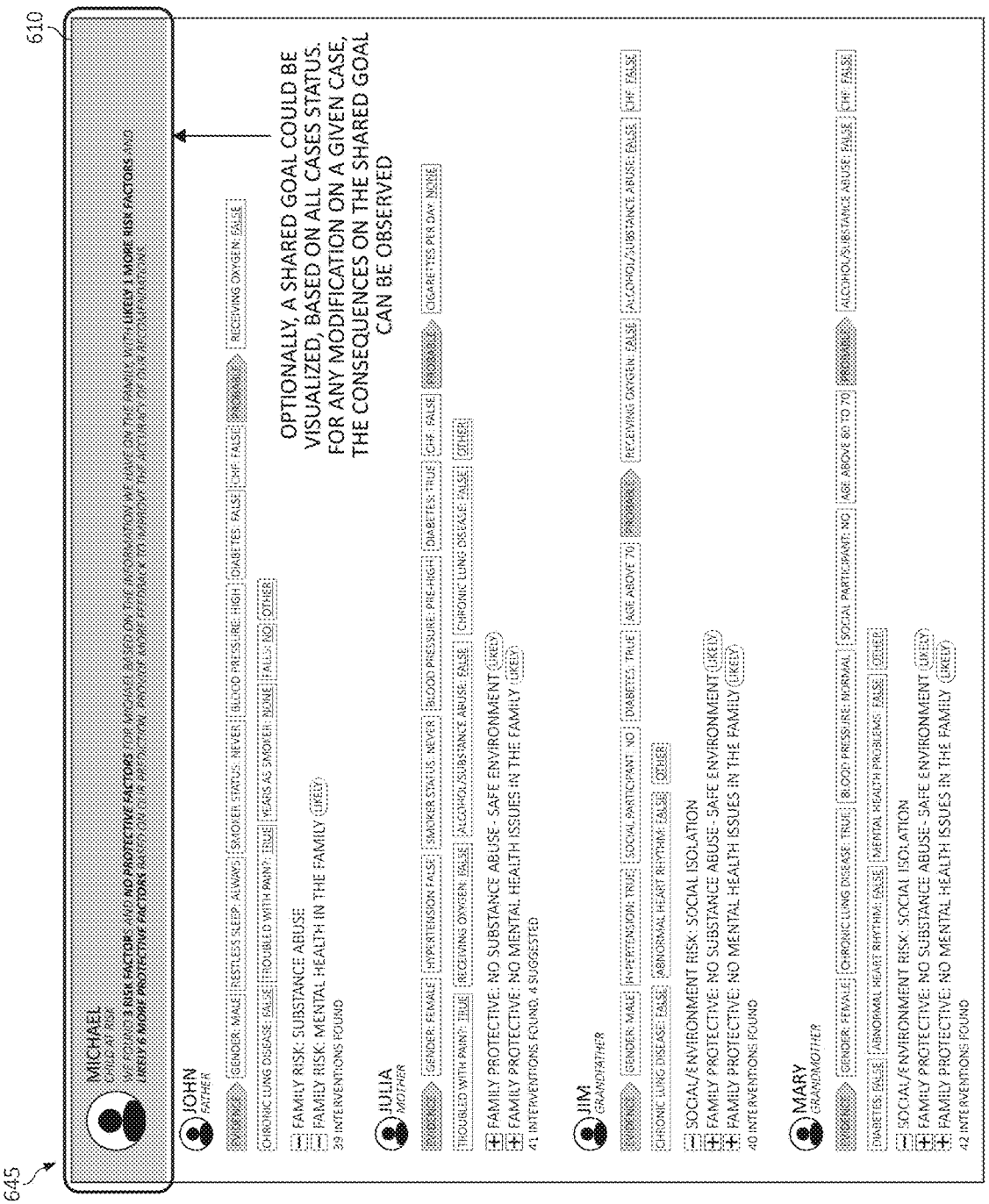

In graph 645 of FIG. 6E, a shared goal may be visualized based on all of the set of instances (e.g., a group of people such as, for example, a family). Any modifications on a selected instance (e.g., one person), all consequence on the shared goal may be observed for all other instances (e.g., other family members). For example, a modification to one dimension or a goal of the patient in relation to the dimension, all consequences and relationships between each other (e.g., one or more dimensions that are dependent from another dimension) may be highlighted such as, for example, the user selecting one or more dimensions such as, for example, "others", the dependencies of blood pressure, body mass index ("BMI"), and number of daily medications may be activated for display (e.g., highlighted for enhance visual appearance and exploration).

For example, if a query is issued to determine a risk, the visualization may provide an output for one of the instances (e.g., a patient named "Michael") there are "3 risk factors and no protective factors identified for Michael based on the information all the family (e.g., the related set of instance), with 1 additional risk factor and 6 more protective factors identified based on a prediction of one or more probabilistic models for each one of a set of instances using multidimensional dataset. Additional feedback is recommended to improve the accuracy of the provided recommendations."

By way of example only, and for illustrative purposes, graphs of FIG. 6A-6E depict four instances (e.g., patient cases) were a statuses of the four instances (e.g., four family members), are determined computed using a Bayesian Network model in a health care environment. One or more (optional) external recommendations may be received or accessed from (1) a risk and protective factors external recommender system (e.g., machine learning system) and (2) an interventions for behavioral changes recommender system (e.g., machine learning system). An (optional) shared goal/insight may be to aggregate a risk and protective factors with respect to a minor at risk in a particular environment.

Also, although the healthcare field is used for illustration purposes in FIGS. 6A-6E, other domains of interest could be easily applied, for example in an enterprise company. For example, different situation may include different business unit performances such as, for example, a software group, research, sales, or doctors/lawyers. Each business unit may have its own probabilistic models for each one of a set of instances using multidimensional dataset. A machine learning system may provide risks that the different business units could experience, as well as possible rewards, or forecasted revenues. A common goal, for example, may be to lower costs and increase the revenue for a company, so that would be the shared insight/goal highlighted all the time.

Figure 7:
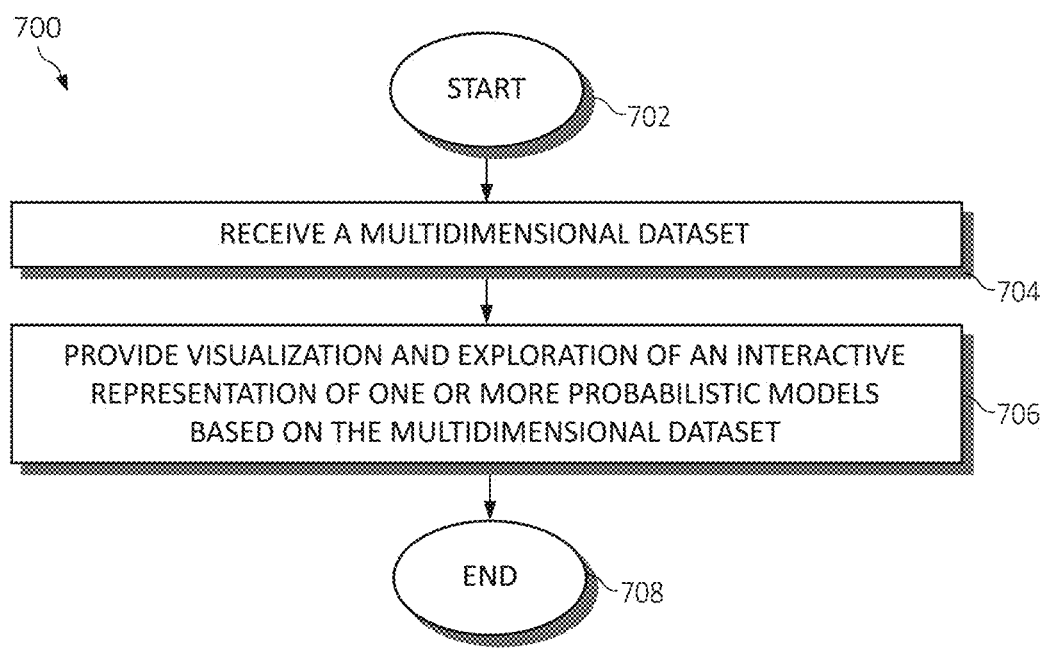
FIGS. 7-8 are flow chart diagrams depicting exemplary methods for providing visualization and exploration of probabilistic models for multiples instances in a computing environment by a processor, again in which aspects of the present invention may be realized.

Turning now to FIG. 7, a method 700 for providing visualization and exploration of probabilistic models in a computing environment is depicted. The functionality 700 may be implemented as a method executed as instructions on a machine, where the instructions are included on at least one computer readable medium or on a non-transitory machine-readable storage medium. The functionality 700 may start in block 702.

A multidimensional dataset may be received, as in block 704. A visualization and exploration of an interactive representation of one or more probabilistic models for each one of a set of instances using the multidimensional dataset, as in block 706. The functionality 700 may end in block 708.

In one aspect, in conjunction with and/or as part of at least one block of FIG. 7, the operations of method 700 may include each of the following. The operations of method 700 may include receiving a multidimensional dataset according to a set of booting operation parameters. The operations of method 700 may rank each of the dimensions according to a degree of relevance associated with the set of instances, where the ranking indicates those of the plurality of dimensions that are included in the interactive representation for visualization and exploration.

The operations of method 700 may provide probabilistic information for each of a plurality of dimensions associated with the set of instances, select or eliminate one or more of the plurality of dimensions based on the probabilistic information; and provide feedback data to a machine learning model and/or an aggregating function for ranking each of the plurality of dimensions associated with the set of instances based on selecting or eliminating the one or more of the plurality of dimensions.

The operations of method 700 may read the multidimensional dataset according to a set of booting operation parameters, learn the one or more probabilistic models using the multidimensional dataset, and train the one or more probabilistic models using the using the multidimensional dataset, as in block 704. The operations of method 700 may select or deselect or more values for one or more of a plurality of dimensions for each one of the set of instances. The operations of method 700 may infer a probability of values for one or more of a plurality of dimensions for each one of the set of instances for the visualization and the exploration based a machine learning model and one or more constraints.

Figure 8:
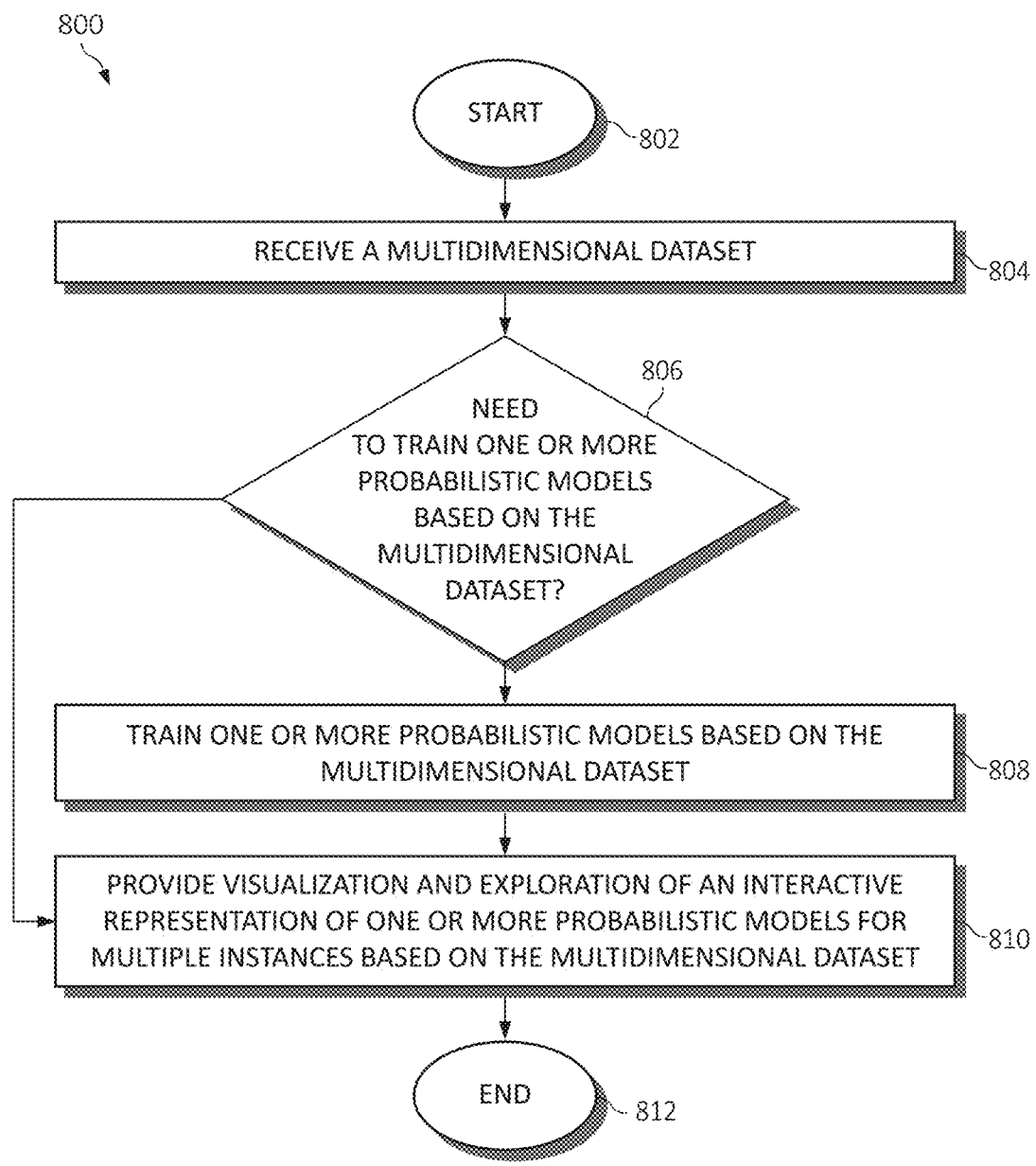

The operations of method 700 may generate one or more recommendations relating to target objectives of one or more of a plurality of dimensions associated with the set of instances Turning now to FIG. 8, a method 800 for providing visualization and exploration of probabilistic models in a computing environment is depicted. The functionality 800 may be implemented as a method executed as instructions on a machine, where the instructions are included on at least one computer readable medium or on a non-transitory machine-readable storage medium. The functionality 800 may start in block 802.

A multidimensional dataset may be received, as in block 804. A determination operation is performed to determine if one or more probabilistic models are required to be trained based on the multidimensional dataset, as in block 806. If yes, from block 806, one or more probabilistic models may be trained (which may include learning, building, and/or constructing) one or more probabilistic models using the one or more probabilistic models based on the multidimensional dataset, as in block 808. If no at block 806, the method may move to block 810. A visualization and exploration of an interactive representation of one or more probabilistic models may be provided based on the multidimensional dataset, as in block 810. The functionality 800 may end in block 812.

In one aspect, in conjunction with and/or as part of at least one block of FIG. 8, the operations of method 800 may include each of the following. The operations of method 800 may include reading the multidimensional dataset according to a set of booting operation parameters. The operations of method 800 may train, learn, and/or build/construct one or more probabilistic models using the one or more probabilistic models, wherein the training occurs online, offline, or a combination thereof.

The operations of method 800 may infer one or more values per dimension for the visualization and exploration based on the one or more values per dimension of the multidimensional dataset selected or deselected by a user, and/or infer one or more values per dimension for the visualization and exploration based on a single value of the multidimensional dataset selected by a user.

The operations of method 800 may providing a relationship between one or more values per dimension for the visualization and exploration based on a single value of the multidimensional dataset selected by a user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method, by a processor, for facilitating data exploration in a computing environment, comprising:
receiving a multidimensional dataset;
executing machine learning logic to perform a booting operation to initiate a graphical user interface (GUI) to be used in exploring the multidimensional dataset;
in conjunction with performing the booting operation, determining, by the machine learning logic, whether training of one or more probabilistic models representing the multidimensional dataset is necessary to provide an interactive representation thereof;
responsive to determining the training is necessary, training the one or more probabilistic models using the multidimensional dataset;
responsive to determining the training is unnecessary, building one or more aggregation functions using multidimensional dataset;
providing visualization and exploration of the interactive representation of the one or more probabilistic models for each one of a set of instances using the multidimensional dataset, wherein each of a plurality of dimensions are ranked according to a degree of relevance associated with the set of instances, wherein the ranking indicates those of the plurality of dimensions that are included in the interactive representation for visualization and exploration; and
in real-time as the interactive representation of the one or more probabilistic models is presented, inferring a probability of values for one or more of a plurality of dimensions for each one of the set of instances for the visualization and the exploration based a machine learning model and one or more constraints, wherein each one of the set of instances is concurrently displayed in the interactive representation, and wherein the inferring of the probability of values includes receiving a selection of the one or more constraints to modify one or more of the plurality of dimensions and depicting a consequence of the selection on each other dimension of the plurality of dimensions and each one of the set of instances based on the inferring.

2. The method of claim 1, further including:
providing probabilistic information for each of the plurality of dimensions associated with the set of instances;
selecting or eliminating one or more of the plurality of dimensions based on the probabilistic information; and
providing feedback data for ranking each of the plurality of dimensions associated with the set of instances based on selecting or eliminating the one or more of the plurality of dimensions.

3. The method of claim 1, further including:
reading the multidimensional dataset according to a set of booting operation parameters;
learning the one or more probabilistic models using the multidimensional dataset; and
training the one or more probabilistic models using the using the multidimensional dataset.

4. The method of claim 1, further including selecting or deselecting or more values for one or more of the plurality of dimensions for each one of the set of instances.

5. The method of claim 1, further including generating one or more recommendations relating to target objectives of one or more of the plurality of dimensions associated with the set of instances.

6. A system for facilitating data exploration in a computing environment, comprising:
one or more computers with executable instructions that when executed cause the system to:
receive a multidimensional dataset;
execute machine learning logic to perform a booting operation to initiate a graphical user interface (GUI) to be used in exploring the multidimensional dataset;
in conjunction with performing the booting operation, determine, by the machine learning logic, whether training of one or more probabilistic models representing the multidimensional dataset is necessary to provide an interactive representation thereof;
responsive to determining the training is necessary, train the one or more probabilistic models using the multidimensional dataset;
responsive to determining the training is unnecessary, build one or more aggregation functions using multidimensional dataset;
provide visualization and exploration of the interactive representation of the one or more probabilistic models for each one of a set of instances using the multidimensional dataset, wherein each of a plurality of dimensions are ranked according to a degree of relevance associated with the set of instances, wherein the ranking indicates those of the plurality of dimensions that are included in the interactive representation for visualization and exploration; and in real-time as the interactive representation of the one or more probabilistic models is presented, infer a probability of values for one or more of a plurality of dimensions for each one of the set of instances for the visualization and the exploration based a machine learning model and one or more constraints, wherein each one of the set of instances is concurrently displayed in the interactive representation, and wherein the inferring of the probability of values includes receiving a selection of the one or more constraints to modify one or more of the plurality of dimensions and depicting a consequence of the selection on each other dimension of the plurality of dimensions and each one of the set of instances based on the inferring.

7. The system of claim 6, wherein the executable instructions when executed cause the system to:

provide probabilistic information for each of the plurality of dimensions associated with the set of instances; and select or eliminate one or more of the plurality of dimensions based on the probabilistic information; and provide feedback data for ranking each of the plurality of dimensions associated with the set of instances based on selecting or eliminating the one or more of the plurality of dimensions.

8. The system of claim 6, wherein the executable instructions when executed cause the system to:

read the multidimensional dataset according to a set of booting operation parameters;

learn the one or more probabilistic models using the multidimensional dataset; and train the one or more probabilistic models using the using the multidimensional dataset.

9. The system of claim 6, wherein the executable instructions when executed cause the system to select or deselect or more values for one or more of the plurality of dimensions for each one of the set of instances.

10. The system of claim 6, wherein the executable instructions when executed cause the system to generate one or more recommendations relating to target objectives of one or more of the plurality of dimensions associated with the set of instances.

11. A computer program product for facilitating data exploration in a computing environment, the computer program product comprising:

one or more non-transitory computer readable storage media, and program instructions collectively stored on the one or more computer readable storage media, the program instruction comprising:

program instructions to receive a multidimensional dataset;

program instructions to execute machine learning logic to perform a booting operation to initiate a graphical user interface (GUI) to be used in exploring the multidimensional dataset;

program instructions to, in conjunction with performing the booting operation, determine, by the machine learning logic, whether training of one or more probabilistic models representing the multidimensional dataset is necessary to provide an interactive representation thereof;

program instructions to, responsive to determining the training is necessary, train the one or more probabilistic models using the multidimensional dataset;

program instructions to, responsive to determining the training is unnecessary, build one or more aggregation functions using multidimensional dataset;

program instructions to provide visualization and exploration of the interactive representation of the one or more probabilistic models for each one of a set of instances using the multidimensional dataset, wherein each of a plurality of dimensions are ranked according to a degree of relevance associated with the set of instances, wherein the ranking indicates those of the plurality of dimensions that are included in the interactive representation for visualization and exploration; and program instructions to, in real-time as the interactive representation of the one or more probabilistic models is presented, infer a probability of values for one or more of a plurality of dimensions for each one of the set of instances for the visualization and the exploration based a machine learning model and one or more constraints, wherein each one of the set of instances is concurrently displayed in the interactive representation, and wherein the inferring of the probability of values includes receiving a selection of the one or more constraints to modify one or more of the plurality of dimensions and depicting a consequence of the selection on each other dimension of the plurality of dimensions and each one of the set of instances based on the inferring.

12. The computer program product of claim 11, further including program instructions to:

provide probabilistic information for each of the plurality of dimensions associated with the set of instances; and select or eliminate one or more of the plurality of dimensions based on the probabilistic information; and provide feedback data for ranking each of the plurality of dimensions associated with the set of instances based on selecting or eliminating the one or more of the plurality of dimensions.

13. The computer program product of claim 11, further including program instructions to:

read the multidimensional dataset according to a set of booting operation parameters;

learn the one or more probabilistic models using the multidimensional dataset; and train the one or more probabilistic models using the using the multidimensional dataset.

14. The computer program product of claim 11, further including program instructions to select or deselect or more values for one or more of the plurality of dimensions for each one of the set of instances.

15. The computer program product of claim 11, further including program instructions to generate one or more recommendations relating to target objectives of one or more of the plurality of dimensions associated with the set of instances.

* * * * *